United States Patent
Kodama

(10) Patent No.: US 11,959,214 B2
(45) Date of Patent: Apr. 16, 2024

(54) INFORMATION PROCESSING SYSTEM

(71) Applicant: WASHHOUSE CO., LTD., Miyazaki (JP)

(72) Inventor: Yasutaka Kodama, Miyazaki (JP)

(73) Assignee: WASHHOUSE CO., LTD., Miyazaki (JP)

( * ) Notice: Subject to any disclaimer, the term of this patent is extended or adjusted under 35 U.S.C. 154(b) by 141 days.

(21) Appl. No.: 17/612,548

(22) PCT Filed: May 20, 2020

(86) PCT No.: PCT/JP2020/019942
§ 371 (c)(1),
(2) Date: Nov. 18, 2021

(87) PCT Pub. No.: WO2020/235592
PCT Pub. Date: Nov. 26, 2020

(65) Prior Publication Data
US 2022/0235509 A1    Jul. 28, 2022

(30) Foreign Application Priority Data

May 21, 2019   (JP) ................................ 2019-095346

(51) Int. Cl.
*D06F 33/30*    (2020.01)
*D06F 34/05*    (2020.01)
(Continued)

(52) U.S. Cl.
CPC .............. *D06F 33/30* (2020.02); *D06F 34/05* (2020.02); *D06F 34/32* (2020.02);
(Continued)

(58) Field of Classification Search
CPC .......... D06F 34/05; D06F 34/04; D06F 33/30; G06Q 30/0207; G06Q 30/0241
See application file for complete search history.

(56) References Cited

U.S. PATENT DOCUMENTS

2005/0091063 A1    4/2005   Bergemann et al.
2015/0127421 A1    5/2015   Nakano et al.
(Continued)

FOREIGN PATENT DOCUMENTS

CN    108541282 A    9/2018
JP    2004-178330 A   6/2004
(Continued)

OTHER PUBLICATIONS

Machine translation of JP-2017205480-A, dated Nov. 2017. (Year: 2017).*

(Continued)

*Primary Examiner* — Joseph L. Perrin
*Assistant Examiner* — Kevin G Lee
(74) *Attorney, Agent, or Firm* — SoCal IP Law Group LLP; Mark Andrew Goldstein

(57) ABSTRACT

This information processing system comprises an information station inside a store, a washing machine, and a user terminal operated by a user, wherein, when the information station detects that the user U has visited the store, the information station executes control to display a QR code for transmitting a store-visit coupon to the user terminal. The washing machine displays an advertisement, and also, when the washing machine detects that the user has used the washing machine, the washing machine executes control to display a QR code for transmitting a usage coupon to the user terminal. The user terminal acquires information indicated by the QR code displayed on the information station and information indicated by the QR code displayed on the washing machine.

12 Claims, 11 Drawing Sheets

(51) Int. Cl.
*D06F 34/32* (2020.01)
*G06Q 30/0207* (2023.01)
*G06Q 30/0241* (2023.01)
*D06F 101/00* (2020.01)
*D06F 105/58* (2020.01)

(52) U.S. Cl.
CPC ..... *G06Q 30/0207* (2013.01); *G06Q 30/0241* (2013.01); *D06F 2101/00* (2020.02); *D06F 2105/58* (2020.02)

(56) References Cited

U.S. PATENT DOCUMENTS

| | | | |
|---|---|---|---|
| 2019/0012620 | A1 | 1/2019 | Takenaka et al. |
| 2019/0382940 | A1 | 12/2019 | Takanashi |

FOREIGN PATENT DOCUMENTS

| | | | |
|---|---|---|---|
| JP | 2004-528892 | A | 9/2004 |
| JP | 2008021303 | A | 1/2008 |
| JP | 2009-271899 | A | 11/2009 |
| JP | 2010-205185 | A | 9/2010 |
| JP | 2015-141708 | A | 8/2015 |
| JP | 2017-140141 | A | 8/2017 |
| JP | 2017-205480 | A | 11/2017 |
| JP | 2018-156677 | A | 10/2018 |
| JP | 2018-181037 | A | 11/2018 |
| WO | 2019077649 | A1 | 4/2019 |
| WO | 2020235592 | A1 | 11/2020 |

OTHER PUBLICATIONS

Machine translation of JP-2009271899-A, dated Nov. 2009. (Year: 2009).*
Machine translation of JP-2015141708-A, dated Aug. 2015. (Year: 2015).*
World Intellectual Property Organization, International Search Report for international application No. PCT/JP2020/019942, dated Aug. 11, 2020, 6 total pages.
Tsurumaki, Yasuo, "WASH house challenge", International News Co., Ltd. Mizuyoshi, Shigeji, Jun. 30, 2017, pp. 224-228, ISBN: 978-4-87218-435-8.
Japan Intellectual Property Office, Japanese Patent Application No. 2020-562222, Notice of Reasons for Refusal, mhtml:http://svapdb04/NvClientDownload/ViewTemp/sa0024/20211015144131.mht, accessed Oct. 10, 2021.

* cited by examiner

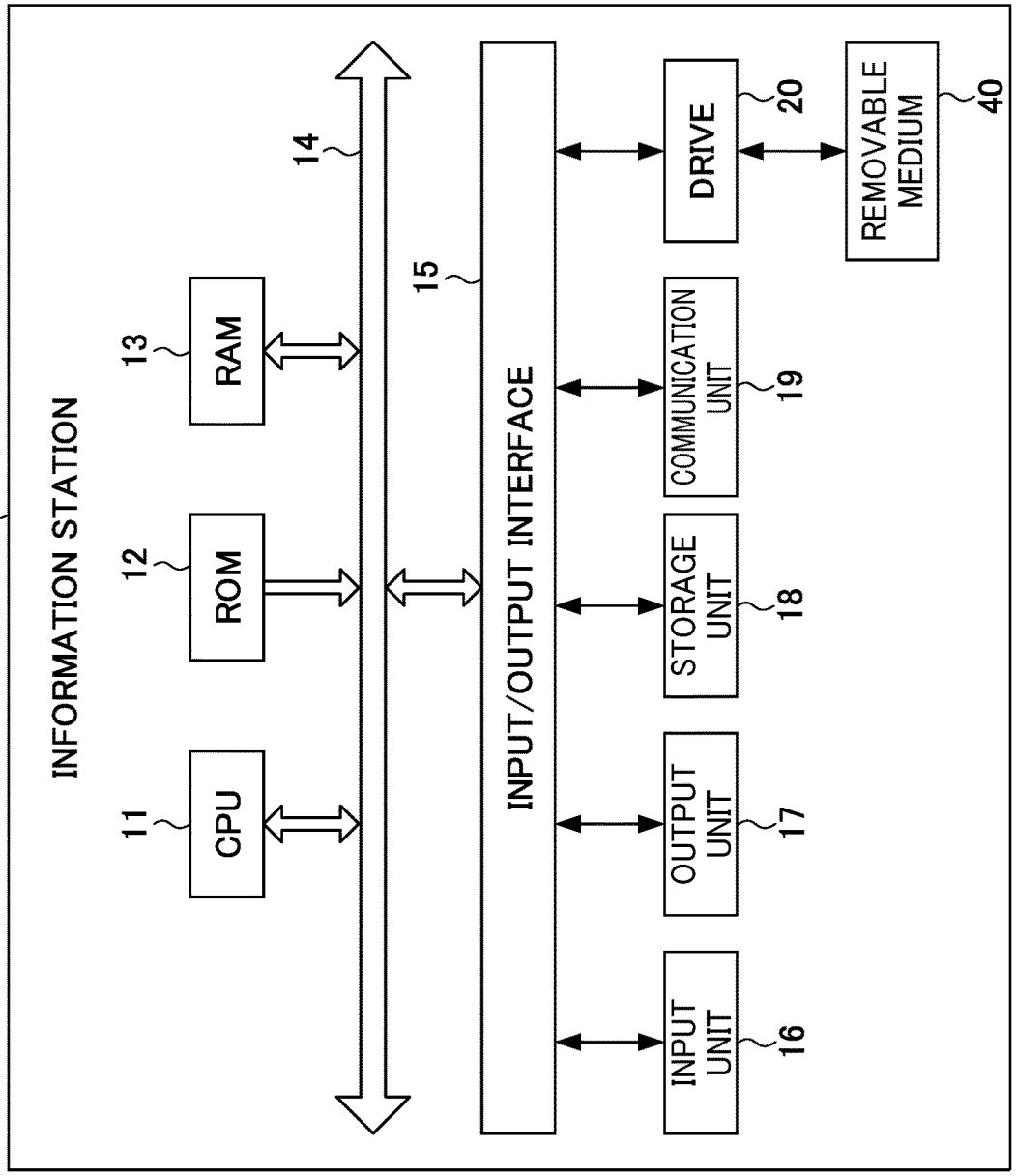

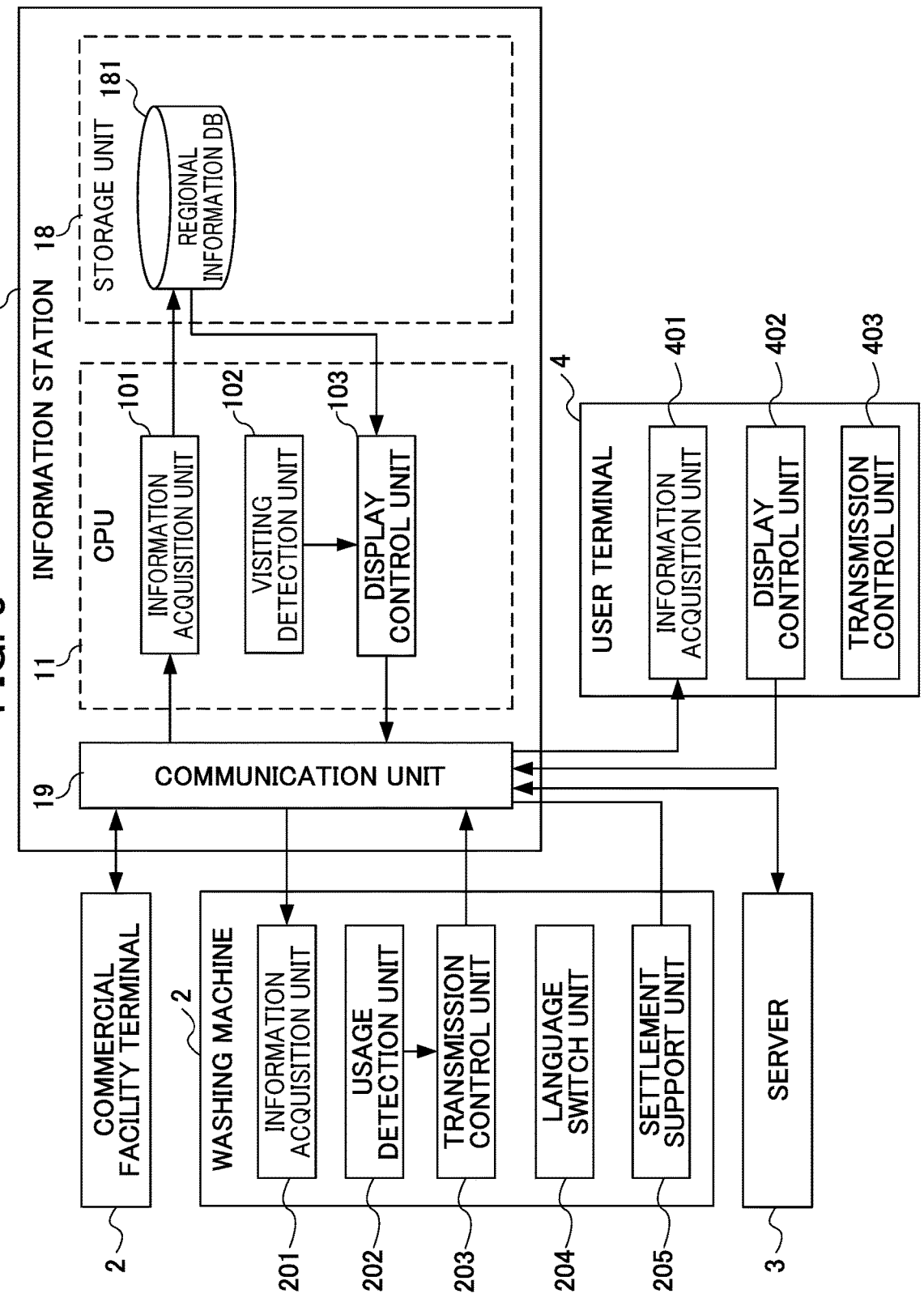

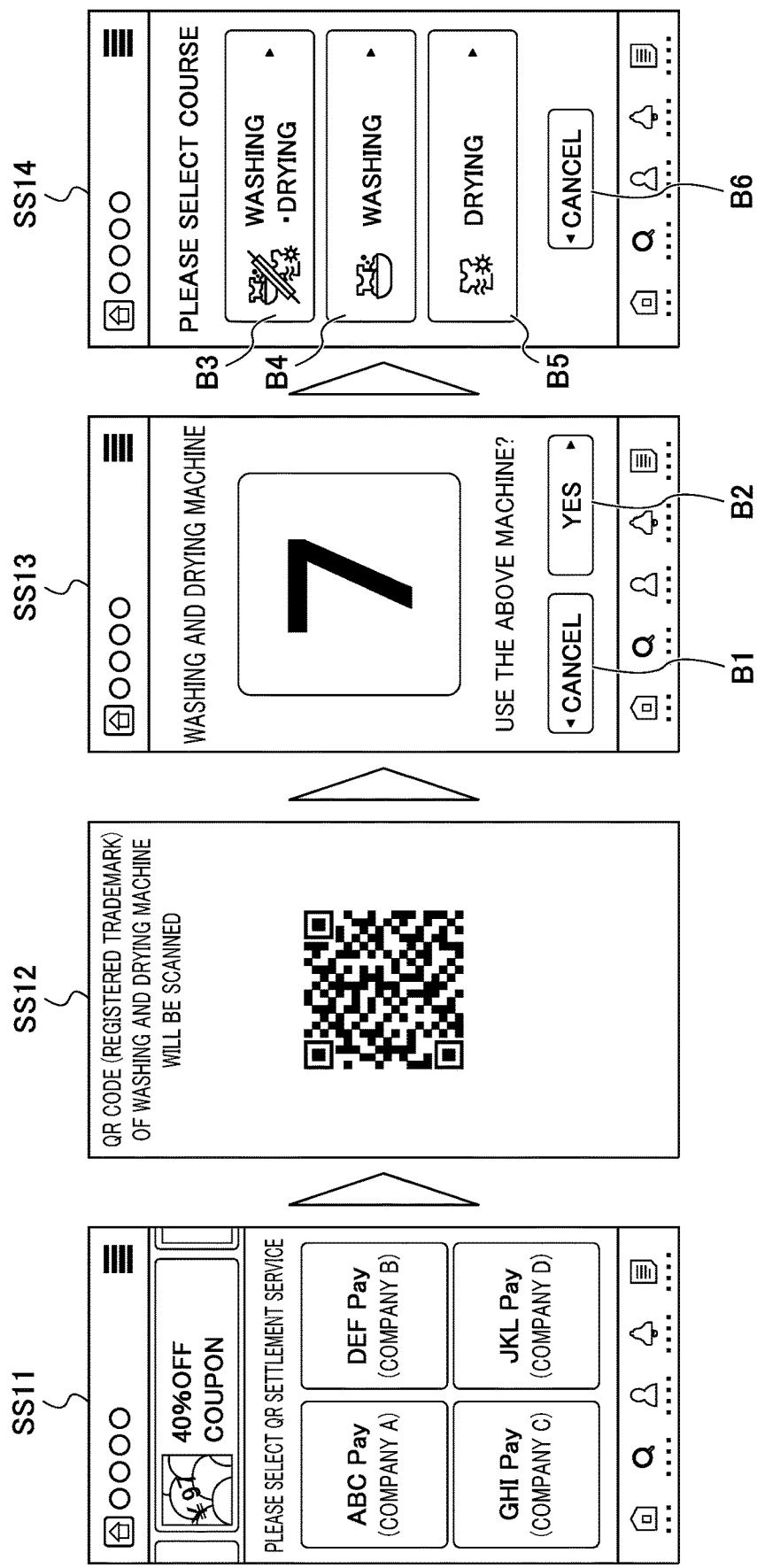

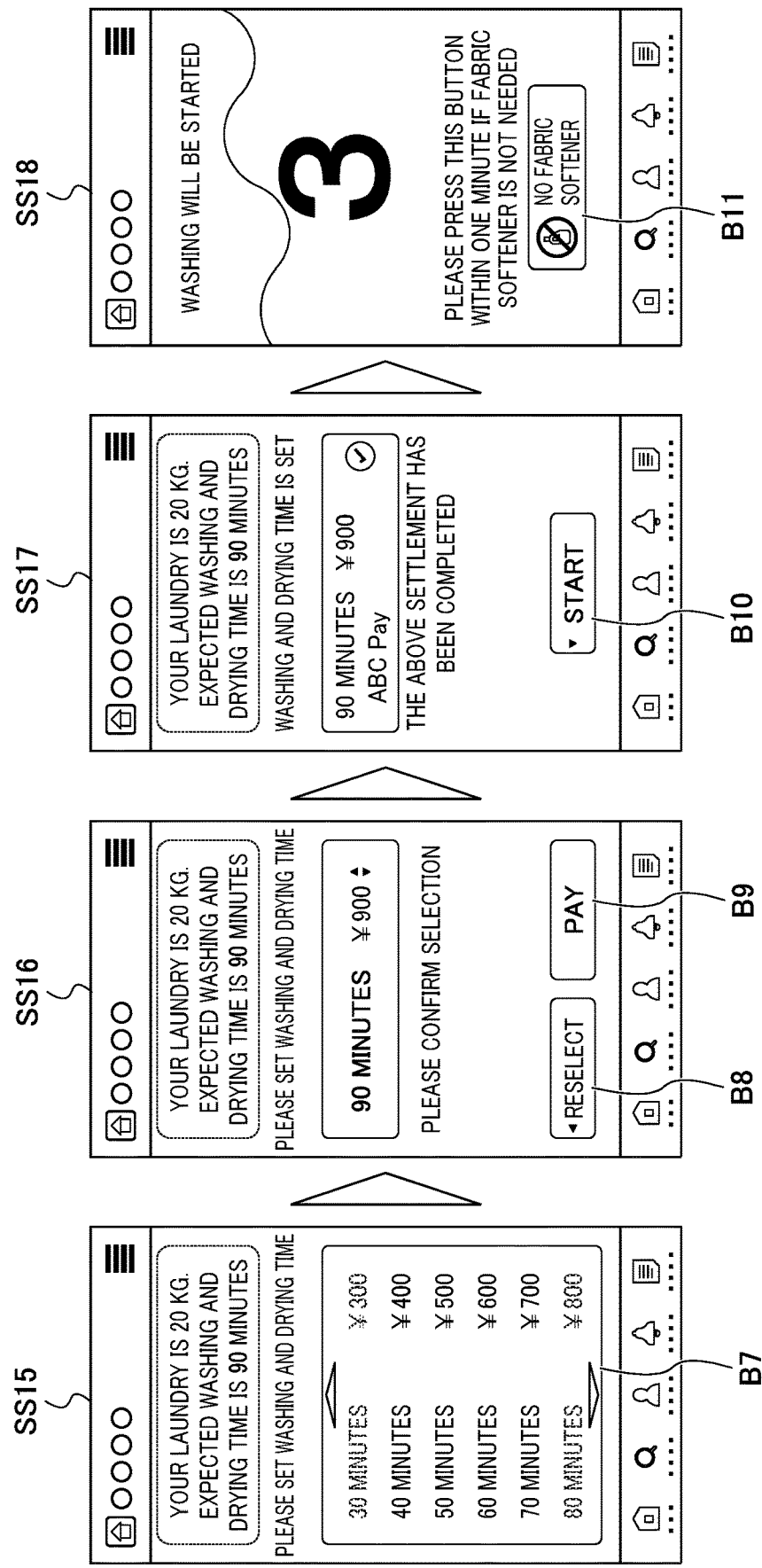

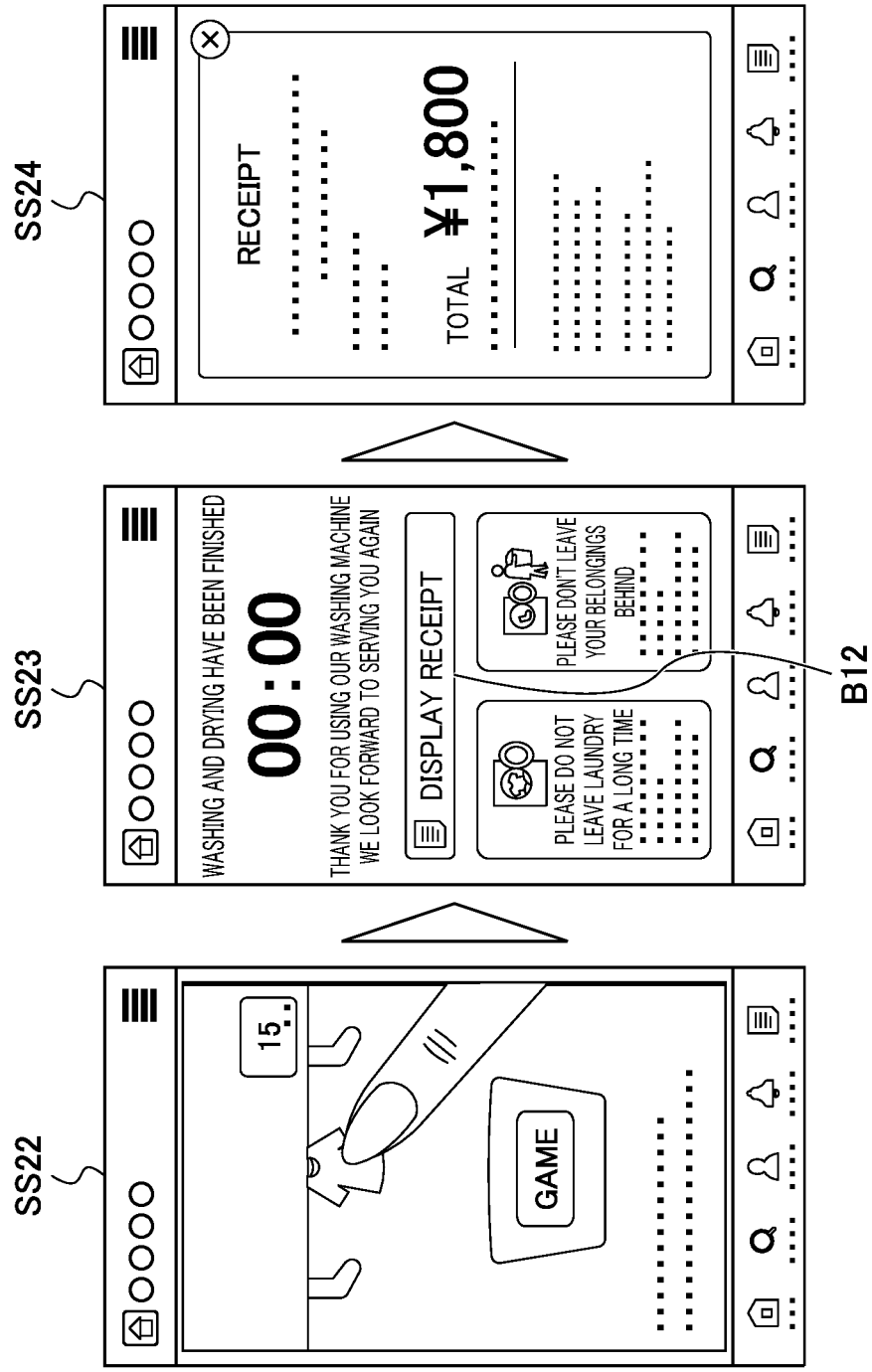

INFORMATION PROCESSING SYSTEM

RELATED APPLICATION INFORMATION

This patent claims priority from International PCT Patent Application No. PCT/JP2020/019942, filed May 20, 2020 entitled, "INFORMATION PROCESSING SYSTEM", which claims priority to Japanese Patent Application No. 2019-095346, filed May 21, 2019 all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

TECHNICAL FIELD

The present invention relates to an information processing system.

BACKGROUND ART

Conventionally, service which is the so-called coin laundry has existed in which a user pays a fee to wash the user's clothes using a washing machine and a drying machine provided in a predetermined store. In such a field, for example, a technique which enables management of operating conditions of the washing machine, or the like, provided in the store from a remote location has been proposed (see Patent Document 1, Japanese Unexamined Patent Application, Publication No. 2018-181037).

BRIEF DESCRIPTION OF THE DRAWINGS

FIG. 4 is a block diagram illustrating an example of a hardware configuration of an information station among the information processing system illustrated in FIG. 3;

FIG. 5 is a functional block diagram illustrating an example of a functional configuration for executing information provision processing among functional components of the information processing system in FIG. 3;

FIG. 6A is a view illustrating a specific example of a UI to be displayed at a user terminal when a user operates the user terminal to utilize a washing machine;

FIG. 6B is a view illustrating a specific example of a UI to be displayed at the user terminal when the user operates the user terminal to utilize the washing machine;

FIG. 6D is a view illustrating a specific example of a UI to be displayed at the user terminal when the user operates the user terminal to utilize the washing machine;

DETAILED DESCRIPTION

Disclosure of the Invention

Problems to be Solved by the Invention

However, related art including the above-described technique disclosed in Patent Document 1 merely enables management of operating conditions of a washing machine by acquiring fee collection information, or the like, from a terminal apparatus provided at the washing machine, or the like, provided in the above-described store. It is therefore desired to develop a technique which improves user-friendliness and a utilization rate of a user who utilizes coin laundry.

The present invention has been made in view of such circumstances, and an object of the present invention is to provide a technique of improving user-friendliness and a utilization rate of a user who utilizes coin laundry by increasing advertising revenue using digital signage.

Means for Solving the Problems

To achieve the above-described object, an information processing system according to one aspect of the present invention is an information processing system including a store terminal provided at a store, a management target apparatus to be managed by the store terminal at the store, and a user terminal to be operated by a user who utilizes the management target apparatus, the store terminal including a first display control unit configured to execute control to display second information for transmitting first information regarding utilization of the store or a nearby commercial facility of the store to the user terminal in a case where a first requirement indicating that the user visits the store is satisfied, the management target apparatus including a second display control unit configured to display a predetermined advertisement and configured to execute control to display fourth information for transmitting third information different from the first information to the user terminal as information regarding utilization of the store or the nearby commercial facility of the store in a case where a second requirement indicating that the user utilizes the management target apparatus is satisfied, and the user terminal including an acquisition unit configured to acquire each of the second information displayed at the store terminal and the fourth information displayed at the management target apparatus.

Effects of the Invention

According to the present invention, it is possible to improve user-friendliness and a utilization rate of a user who utilizes coin laundry by increasing advertising revenue using digital signage.

PREFERRED MODE FOR CARRYING OUT THE INVENTION

An embodiment of the present invention will be described below using the drawings.

First, an outline of a service (hereinafter, referred to as "the present service") which can be implemented by an information processing system (see FIG. 3 which will be described later) according to one embodiment of the present invention will be described with reference to FIG. 1.

Figure 1:
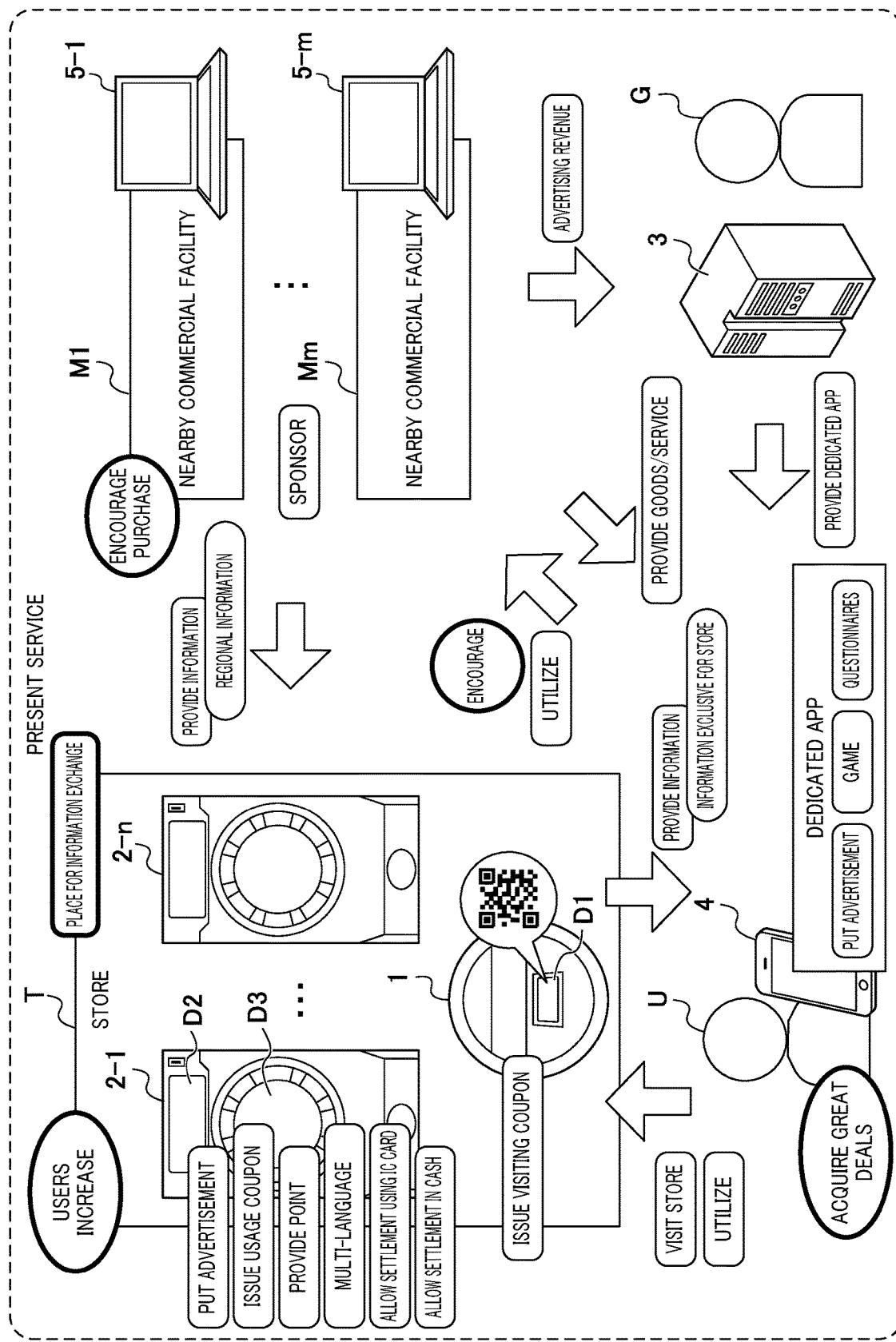
FIG. 1 is a view illustrating an outline of the present service which can be implemented by an information processing system according to one embodiment of the present invention.

FIG. 1 is a view illustrating outline of the present service which can be implemented by the information processing system according to one embodiment of the present invention.

The present service is service to be provided from a service provider G to a user U and nearby commercial facilities M1 to Mm (where m is an arbitrary integer value equal to or greater than 1).

The service provider G is a person who operates a store T of the so-called coin laundry (hereinafter, simply referred to as a "store T") in a predetermined region as a provider of the present service. At the store T, washing machines 2-1 to 2-n (where n is an arbitrary integer value equal to or greater than 1) to be utilized by the user U and an information station 1 which manages the washing machines 2-1 to 2-n are provided. Hereinafter, in a case where it is not necessary to individually distinguish the washing machines 2-1 to 2-n from each other, these will be collectively referred to as a "washing machine 2".

The user U is a person who utilizes the store T to wash clothes, or the like. In a case where the user U utilizes the present service, the user U performs operation on dedicated application software (hereinafter, referred to as a "dedicated app") which is installed at the user terminal 4 and which enables utilization of the present service. Further, the user U can utilize the present service also by accessing a dedicated website (hereinafter, referred to as a "dedicated site") which is displayed by a browser function of the user terminal 4 and which enables utilization of the present service. Further, the user U can make various kinds of settlement via the dedicated app or the dedicated site. Here, "various kinds of settlement" include, for example, settlement of payment of a usage fee of the present service (in a case where the present service is fee-charging service), settlement of a fee to be paid in a case where the user U utilizes the washing machine 2 via the present service, and the like. This enables the user U to utilize the present service in the so-called cashless manner. Hereinafter, it is assumed that "the user U operating the user terminal 4" means that the user U utilizes the present service from the dedicated app or the dedicated site.

The nearby commercial facilities M1 to Mm are commercial facilities other than the store T located in the predetermined region. The "commercial facility" described here refers to a facility which provides goods or service and receives a predetermined compensation. For example, examples of the commercial facility include a greengrocer, a fish store, a butcher, a convenience store, a supermarket, a book store, a clothes store, a general store, a hair salon, a barber, and the like. Commercial facility terminals 5-1 to 5-m are respectively provided at the nearby commercial facilities M1 to Mm. Each of the commercial facility terminals 5-1 to 5-m transmits regional information to the information station 1.

The information station 1 provided at the store T acquires the regional information provided from the nearby commercial facility M which is a sponsor of the present service. Here, the "regional information" refers to information regarding the predetermined region in which the store T is located. The regional information includes information regarding an advertisement and a coupon for the nearby commercial facility M, information regarding opening hours and a location, and other various kinds of information regarding the nearby commercial facility M. The information station 1 includes a display D1. Advertisements of the nearby commercial facility M and the store T are displayed on the display D1 as digital signage advertisements. For example, a QR code (registered trademark) as information for transmitting the regional information and information exclusive for visitors to the user terminal 4 is displayed on the display D1. Here, the "information exclusive for visitors" refers to information regarding utilization of the store T, which is provided only to the user U who has visited the store T. The information exclusive for visitors includes, for example, a coupon to be provided only to the user U who has visited the store T (hereinafter, referred to as a "visiting coupon") and a point to be provided only to the user U who has visited the store T (hereinafter, referred to as a "visiting point"). Further, the information exclusive for visitors also includes an advertisement, or the like, of the store T. By this means, the regional information and the information exclusive for visitors are provided to the user U, so that the user U can acquire the so-called "Great deals". Further, the user U is encouraged to visit the nearby commercial facility M, which leads to encouragement of purchase at the nearby commercial facility M. Further, the service provider G can increase the number of users (users U) of the store T and can obtain advertising revenue from the nearby commercial facility M.

It is assumed that the washing machine 2 includes a washing machine, a laundry dryer, and a washing and drying machine provided at the store T to be utilized by the user U. The washing machine 2 includes displays D2 and D3.

A user interface (UI) to be used by the user U to utilize the washing machine 2 and a digital signage advertisement are displayed on the display D2. For example, a QR code (registered trademark) is displayed on the display D2 as information for transmitting the regional information and information exclusive for users to the user terminal 4. The "information exclusive for users" to be displayed on the display D2 refers to information regarding utilization of the washing machine 2, which is to be provided only to the user U who has utilized the washing machine 2. The information exclusive for users includes, for example, a coupon to be provided only to the user U who has utilized the washing machine 2 (hereinafter, referred to as a "usage coupon") and a point to be provided only to the user U who has utilized the washing machine 2 (hereinafter, referred to as a "usage point"). The information exclusive for users includes an advertisement, or the like, of the store T.

Note that there is a difference in content between the "information exclusive for users" to be displayed on the display D2 of the washing machine 2 and the above-described "information exclusive for visitors" to be displayed on the display D1 of the information station 1, and information indicating that there is a difference is clearly specified. In other words, it is possible to make information to be provided to the user U who has actually utilized the washing machine 2 more advantageous for the user U than information to be provided to the user U who has visited the store T. This can encourage increase in the number of users of the washing machine 2.

Further, the UI to be displayed on the display D2 of the washing machine 2 supports the so-called "multi-language". By this means, switching between languages of messages and the like to be displayed at the washing machine 2 can be easily performed, which allows also foreigners to utilize the store at ease. This can result in improvement of user-friendliness and a utilization rate of the store T. Further, it can be expected to increase utilization of the nearby commercial facility M by foreigners, which can contribute to regional activation. Note that a specific example of the UI to be displayed on the display D2 of the washing machine 2 will be described later with reference to FIG. 2.

The display D3 is a display provided on a surface of a transparent or a semi-transparent lid through which laundry is input and output to and from the washing machine 2. Advertisements of the nearby commercial facility M and the store T are displayed on the display D3 as digital signage advertisements. Further, a state of the display D3 can be switched among a transparent state, a semi-transparent state and an opaque state in a stepwise manner in response to operation of pressing a predetermined button (not illustrated). Note that the term "stepwise" used herein includes gradation (multiple-stage change). In other words, the term "stepwise" includes gradual change from the transparent state to the semi-transparent state and then to the opaque state and gradual change from the opaque state to the semi-transparent state and then to the transparent state. In other words, the user U can set a preferred degree of transparency. By this means, for example, the user U who desires to prevent others from peeping inside the washing machine 2 can protect privacy by setting the opaque state as the state of the display D3. Further, for example, the user U who does not care if other people can see but cares about a state of laundry can always confirm the laundry which is being washed from outside of the lid by setting the transparent state as the state of the display D3. Further, the default state of the display D3 can be arbitrarily set on the store T side. In other words, the opaque state can be set as default, or the transparent state can be set as default. Still further, the default state can be set in multiple stages.

Further, the lid including the display D3 has a lock function. The lock function refers to a function of locking the lid in a closed state and preventing the lid from being opened and unlocking the locked lid to allow the lid to be opened. Note that timings at which the lid is locked and unlocked can be arbitrarily set for each washing machine 2. For example, in a case where the washing machine 2 is a so-called drying machine, the washing machine 2 may be put into an unlocked state as default and may be automatically locked at a timing after a predetermined number of times (for example, three times) of rotation since the lid has been closed and drying has been started. Further, for example, in a case where the washing machine 2 is a so-called washing machine, the lid may be locked at a timing at which the lid is closed and washing is started, and the locked state may be maintained also after washing is finished until the user U performs operation of unlocking the lid. By this means, even if the user U goes outside the store T during washing and thereafter returns to the store T later, no one else can open the lid. This can prevent, for example, theft of laundry. However, a problem arises that if collection of laundry which has been washed becomes late, a turnover rate of customers at the store T becomes worse. Thus, a predetermined usage policy may be provided for each store T (or collectively by the service provider G) so as to enable the store T to forcibly unlock the lid and temporarily store laundry if the laundry is not collected even after a predetermined time has elapsed since washing has been finished. This can keep a turnover rate of customers at the store T. Further, as the lock function, the user U may be able to lock and unlock the washing machine 2 by operating the user terminal 4. This can allow, for example, someone in a family to go to the store T and allow the user U to unlock the washing machine 2 through remote operation even if the user U goes outside the store T during washing and thereafter returns to the store T late.

Further, in the present service, a visiting point is provided to the user U who has visited the store T. Further, a usage point is provided to the user U who has utilized the washing machine 2. Here, for the same reason as a reason of allowance for a difference in content being provided between the above-described information exclusive for users and information exclusive for visitors, a difference can be provided to the number of points between the usage point and the visiting point. In other words, it is possible to provide more points to the user U who has actually utilized the washing machine 2 as the usage point than points to be provided to the user U who has visited the store T as the visiting point. This can encourage increase in the number of times of use of the washing machine 2.

Further, the user U who utilizes the washing machine 2 can make settlement with an IC card. This enables a person who cannot utilize settlement from the dedicated app and a person who cannot make settlement in cash to utilize the washing machine 2 as the user U. As a result, it is possible to further improve user-friendliness and the number of times of use of the washing machine 2.

Further, the user U who utilizes the washing machine 2 can make settlement in cash. This enables a person who cannot utilize settlement from the dedicated app and a person who cannot make settlement with an IC card can utilize the washing machine 2 as the user U. As a result, it is possible to further improve user-friendliness and the number of times of use of the washing machine 2.

Further, the service provider G manages the server 3. The server 3 makes various kinds of settings (for example, settings of fees) in the present service, and performs operation check and remote operation of the information station 1 and the washing machine 2, management and analysis of sales for each store T, and support for downloading of sales analysis results. Further, the server 3 provides the dedicated app and the dedicated site to the user terminal 4 and supports settlement using a QR code (registered trademark), or the like.

Figure 2:
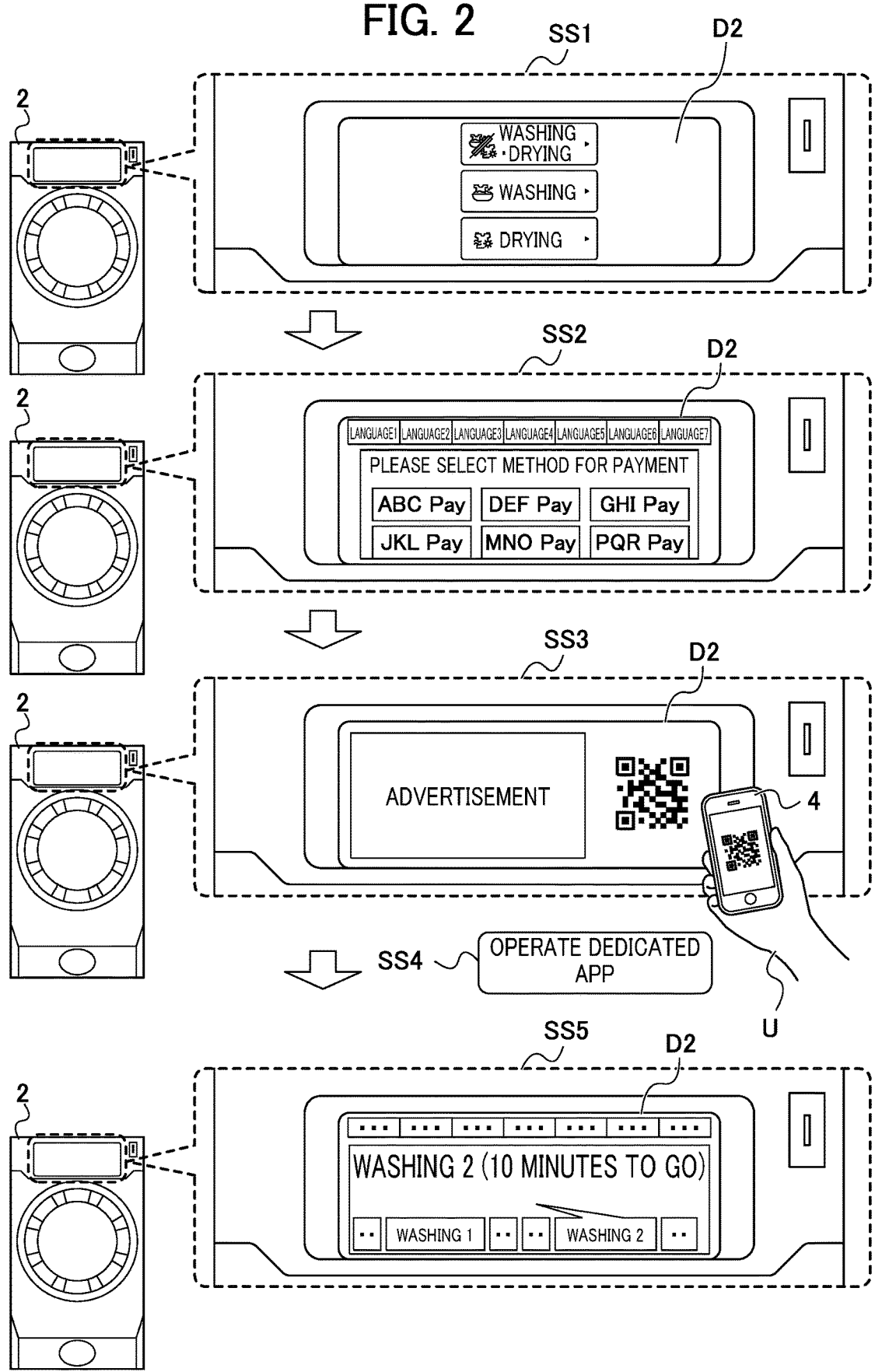
FIG. 2 is a view illustrating a specific example of a utilization method of a washing machine by a user U.

How the user U utilizes the washing machine 2 will be described next with reference to FIG. 2. FIG. 2 is a view illustrating a specific example of a utilization method of the washing machine by the user U.

Buttons for selecting a course are displayed on the display D2 of the washing machine 2 (step SS1). Specifically, as buttons for selecting one of three courses, a "washing and drying" button, a "washing" button, and a "drying" button are displayed. The user U puts laundry in the washing machine 2 and selects one of the three courses displayed at the user terminal 4. Note that description will be provided here assuming that, for example, "washing" is selected.

If "washing" is selected, a method for settlement of a usage fee of the washing machine 2 is displayed on the display D2 so as to be able to be selected (step SS2). Further, as a multi-language function, a plurality of types (in the example in FIG. 2, seven types) of language are displayed so as to be able to be selected. The user U performs operation of selecting the language to use and the method for payment. Note that description will be provided here assuming that, for example, "Japanese" is selected.

If the language to use and the method for payment are selected, a QR code (registered trademark) is displayed along with a digital signage advertisement. The user U reads the QR code (registered trademark) displayed on the display D2 using the user terminal 4 (step SS3). Thereafter, the user U performs operation using the dedicated app (step SS4). Specifically, the user U selects the store T which the user U has visited, selects an apparatus (washing machine 2) to be utilized, selects a washing time and fee and performs settlement procedure. The user U then performs operation for issuing an instruction to start operation. By this means, washing by the washing machine 2 is started.

When the washing machine 2 starts washing, a stage of washing and a remaining time until the end of washing are displayed on the display D2 (step SS5). Specifically, each stage (in the example in FIG. 2, "washing 2") of "water feeding 1", "washing 1", "dewatering 1", "water feeding 2", "washing 2" and "dewatering 2" and a remaining time (in the example in FIG. 2, "10 minutes to go") are displayed.

Note that while not illustrated, the digital signage advertisement and the QR code (registered trademark) can be displayed on the display D2 of the washing machine 2 from the beginning besides the above-described aspect. In this case, the above-described operation (step SS1) of selecting the course and operation (step SS2) of selecting a method for payment can be allowed to be performed through the dedicated app by causing the user terminal 4 to read the QR code (registered trademark).

In conclusion, according to the present service, for example, the following functions and effects can be achieved. In other words, according to the present service, it is possible to increase advertising revenue by utilizing digital signage with the information processing system centering on three pillars of the information station 1, the washing machine 2 and the user terminal 4. This results in making it possible to lower a usage fee of the washing machine 2 to be charged to the user U, and eventually achieve no charge. Further, it is possible to encourage increase of the users U who utilize the store T, so that the store T can be made to function as a place which creates new flow of people. Further, the store T can be made to function as a place of the so-called salon where regional information is offered and exchanged. This can improve awareness of the nearby commercial facility M which sponsors the present service.

Further, it is also possible to provide service that in a case where, for example, a coupon for a nearby hair salon (for example, discount of 20% on a haircut) is provided to the user U as the regional information, if the user U actually utilizes the hair salon, a usage fee of the store T is discounted by 100 yen next time. This can improve a repeat ratio of the store T. Further, for example, a discount coupon, or the like (for example, a half-off coupon for fresh food) of a nearby supermarket can be issued as the regional information. By this means, the present service can be applied to daily routine of a housewife of washing and grocery shopping. Further, it is possible to make flexible response such as issuance of coupons in accordance with everyday events to be held in the predetermined region. Specifically, for example, in a case where a sports day is held at a nearby elementary school, it is possible to enable a convenience store to issue a discount coupon for items (for example, discount of 30 yen on a rice ball) in accordance with the sports day. Further, concerning a visiting point which is provided when the user U has visited the store, it is also possible to issue some kind of coupon if the user U visits the store T five times. This can improve a repeat ratio.

Further, according to the present service, it is also possible to provide application software of games for children which can be downloaded only in a case where the user U visits the store T. This can attract users U who have children. Further, a game which can be played by the user U can be provided on the display D1 of the information station 1 or other devices which are not illustrated. Specifically, for example, it is also possible to provide a slot game of a character of the present service, which is allowed to be played when the user U visits the store and enable a result of the game to be reported to the dedicated app. Further, characters (for example, local characters) unique to the store T which can be collected with the dedicated app may be set. Still further, a predetermined coupon (for example, a charge-free coupon) may be provided to the user U who has succeeded in collecting a specific number (for example, five) of characters. Further, a rare character which is the so-called "super rare character" (for example, a character in the motif of a company president of the service provider G) may be set for the store T with poor sales. This can encourage the user U to utilize the store T with poor sales. Further, to encourage the user U to utilize the store T with poor sales, the number of points of the visiting point which can be acquired by the user U at the target store T can be made twice as many as the number of points which can be acquired at other stores, or a visiting coupon which makes no charge for a usage fee can be issued. Further, an advantageous point can be provided to the user U who has collected the laundry within a predetermined time after washing had been finished. By this means, it can be expected to decrease the number of users U who come to collect the laundry late after washing has been finished. Further, the usage fee of the washing machine 2 can be flexibly lowered in accordance with the weather of the day or a slow season. Specifically, for example, the usage fee of all the washing machines 2 can be cut by 40% in August. Further, a visiting coupon, a usage coupon, a receipt, or the like, provided to the user U can be printed out with the information station 1.

Further, according to the present service, various kinds of questionnaires can be displayed at the dedicated app. This can effectively use a waiting time of the user U after washing is started. Note that an entity which issues the questionnaires is not limited to the service provider G and may be the nearby commercial facility M. In other words, the questionnaires may be questionnaires regarding a business type different from a business type (coin laundry) to which the service provider G belongs (hereinafter, referred to as "questionnaires regarding a different business type"). Specifically, for example, in a case where an entity which issues questionnaires regarding a different business type is a sweets shop which is famous in the predetermined region, the sweets shop can issue questionnaires for consumption regarding, for example, sweets for the purpose of consumer research. A wide variety of users U visit the store T, and thus, it can be expected that results different from results of the questionnaires obtained from customers who have visited the sweets shop can be obtained. Further, a privilege (for example, a charge-free coupon for sweets corresponding to 300 yen) may be provided to the user U who has answered gender, age, a family structure, frequency of purchase, a purchased amount, or the like, to the questionnaires regarding a different business type. This can increase the number of users U who answer the questionnaires regarding a different business type, so that the entity which issues the questionnaires regarding a different business type (for example, the sweets shop) can expect acquisition of new customers, improvement in awareness and, eventually, increase in revenue.

Further, in the present service, an advertisement can be always displayed in a predetermined display region of the UI of the dedicated app. Still further, a point may be provided to the user U who allows display of a video advertisement and performs reproduction operation.

Figure 3:
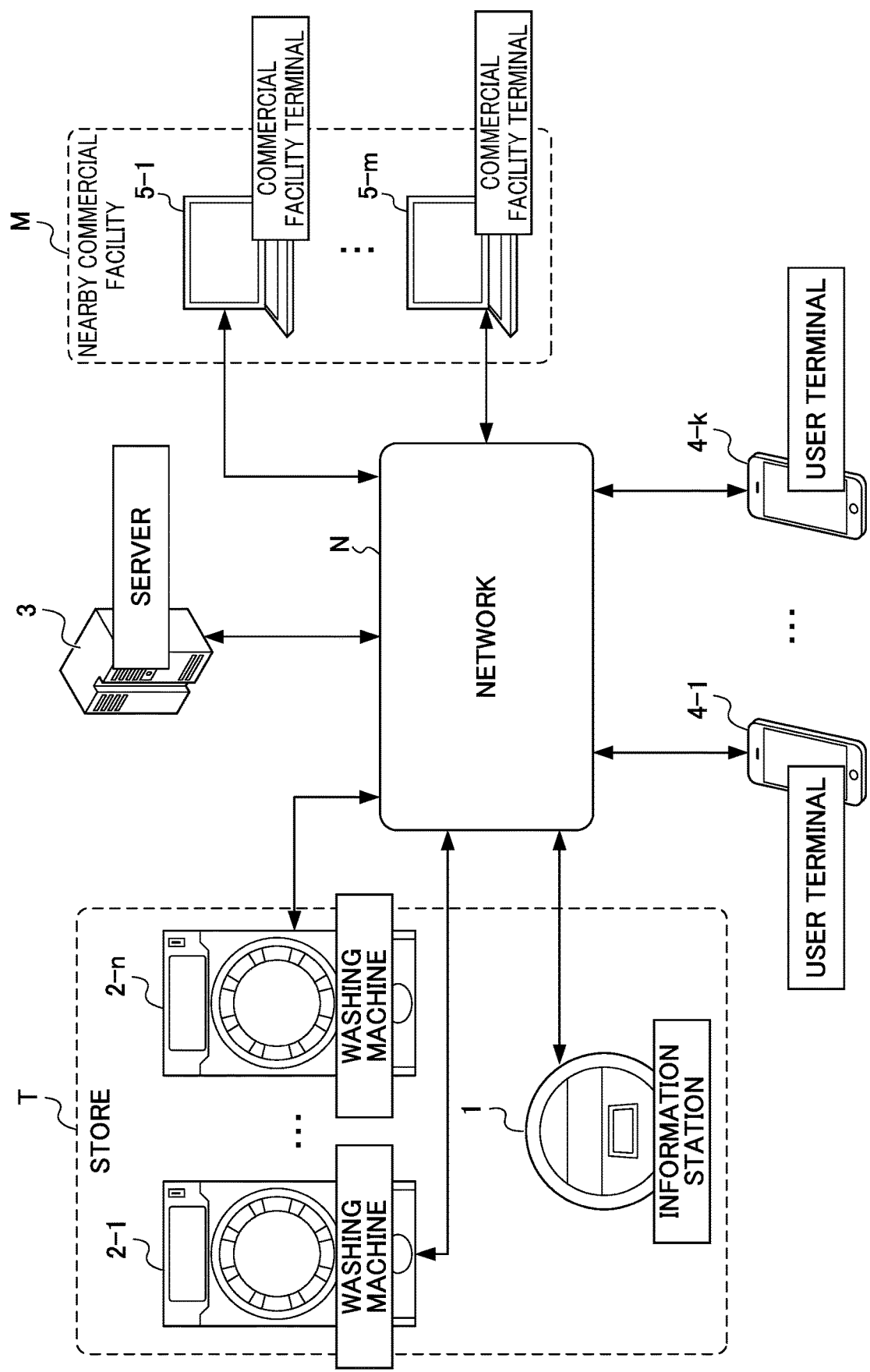
FIG. 3 is a view illustrating an example of a configuration of the information processing system according to one embodiment of the present invention.

A configuration of an information processing system which embodies provision of the above-described present service, that is, an information processing system according to one embodiment of the present invention will be described next with reference to FIG. 3. FIG. 3 is a view illustrating an example of the configuration of the information processing system according to one embodiment of the present invention.

The information processing system illustrated in FIG. 3 includes the information station 1, the washing machines 2-1 to 2-n, the server 3, user terminals 4-1 to 4-k (where k is an arbitrary integer value equal to or greater than 1) and the commercial facility terminals 5-1 to 5-m. Note that in the present specification, in a case where it is not necessary to individually distinguish among the washing machines 2-1 to 2-n, among the user terminals 4-1 to 4-k, and among the commercial facility terminals 5-1 to 5-m, they will be respectively collectively referred to as the "washing machine 2", the "user terminal 4" and the "commercial facility terminal 5". Further, in this case, a person who operates the user terminal 4 will be referred to as the "user U". The information station 1, the washing machine 2, the server 3, the user terminal 4 and the commercial facility terminal 5 are connected to one another via a predetermined network N such as the Internet.

The information station 1 is an information processing apparatus to be managed by the service provider G. The information station 1 is provided near the entrance of the store T and manages the washing machines 2-1 to 2-n provided at the store T. Further, the information station 1 displays a digital signage advertisement and displays a QR code (registered trademark) as information for transmitting various kinds of information (for example, the visiting coupon) to the user terminal 4 of the user U who visits the store T. The information station 1 executes various kinds of processing for implementing the present service while communicating with each of the washing machines 2-1 to 2-n, the server 3 and the user terminal 4 as appropriate.

The washing machine 2 is a washing machine, a laundry dryer or a washing and drying machine provided at the store T for business use to be utilized by the user U.

The server 3 is a server to be managed by the service provider G. The server 3 executes various kinds of processing for implementing the present service while communicating with each of the information station 1, the washing machine 2, the user terminal 4 and the commercial facility terminal 5 as appropriate.

The user terminal 4 is an information processing apparatus to be operated by the user U. The user terminal 4 includes, for example, a smartphone, a tablet, or the like.

The commercial facility terminal 5 is an information processing apparatus to be managed by the nearby commercial facility M. The commercial facility terminal 5 includes, for example, a smartphone, a tablet, or the like.

FIG. 4 is a block diagram illustrating an example of a hardware configuration of the information station among the information processing system illustrated in FIG. 3.

The information station 1 includes a central processing unit (CPU) 11, a read only memory (ROM) 12, a random access memory (RAM) 13, a bus 14, an input/output interface 15, an input unit 16, an output unit 17, a storage unit 18, a communication unit 19 and a drive 20.

The CPU 11 executes various kinds of processing in accordance with a program recorded in the ROM 12 or a program loaded to the RAM 13 from the storage unit 18. Data, or the like, necessary for the CPU 11 to execute various kinds of processing is also stored in the RAM 13 as appropriate.

The CPU 11, the ROM 12 and the RAM 13 are connected to one another via the bus 14. The input/output interface 15 is also connected to the bus 14. The input unit 16, the output unit 17, the storage unit 18, the communication unit 19 and the drive 20 are connected to the input/output interface 15.

The input unit 16, which includes, for example, a keyboard, or the like, outputs various kinds of information. The output unit 17, which includes a display such as a liquid crystal, a speaker, or the like, outputs various kinds of information as an image or audio. The storage unit 18, which includes a dynamic random access memory (DRAM), or the like, stores various kinds of data. The communication unit 19 performs communication with other apparatuses (for example, the washing machine 2, the server 3, the user terminal 4 and the commercial facility terminal 5 in FIG. 2) via the network N including the Internet.

A removable medium 40 which includes a magnetic disk, an optical disk, a magnetooptical disk, a semiconductor memory, or the like, is mounted on the drive 20. The program read out from the removable medium 40 by the drive 20 is installed at the storage unit 18 as necessary. Further, the removable medium 40 can also store various kinds of data stored in the storage unit 18 in a similar manner to the storage unit 18.

Note that while not illustrated, the washing machine 2, the server 3, the user terminal 4 and the commercial facility terminal 5 in FIG. 3 can have configurations which are basically similar to the hardware configuration illustrated in FIG. 4. Thus, description of the hardware configurations of the washing machine 2, the server 3, the user terminal 4 and the commercial facility terminal 5 will be omitted.

Various kinds of processing including information provision processing in the information processing system can be executed by collaboration among various kinds of hardware which constitute such an information processing system in FIG. 4 and various kinds of software. As a result, the service provider G can provide the above-described present service to the user U and the nearby commercial facility M. The "information provision processing" refers to processing of informing the user U of information regarding utilization of the store T and the nearby commercial facility M via the user terminal 4. Functional components for executing the information provision processing to be executed in the information processing system will be described below.

FIG. 5 is a functional block diagram illustrating an example of the functional components for executing the information provision processing among functional components of the information processing system in FIG. 3.

As illustrated in FIG. 5, in a case where the information processing system in FIG. 3 executes the information provision processing, an information acquisition unit 101, a visiting detection unit 102 and a display control unit 103 function at the CPU 11 of the information station 1. Further, an information acquisition unit 201, a usage detection unit 202, a display control unit 203, a language switch unit 204 and a settlement support unit 205 function at a CPU which is not illustrated, of the washing machine 2. Further, an information acquisition unit 401, a display control unit 402 and a transmission control unit 403 function at a CPU which is not illustrated, of the user terminal 4. Note that a regional information DB 181 is provided in one area of the storage unit 18 of the information station 1.

The information acquisition unit 101 acquires the regional information acquired from the commercial facility terminal 5. The regional information acquired by the information acquisition unit 101 is stored in the regional information DB 181 and managed.

The visiting detection unit 102 detects that the user U visits the store T. Note that a specific method to be used by the visiting detection unit 102 to detect visiting of the user U is not particularly limited. For example, visiting may be detected by a predetermined button (not illustrated) displayed on a screen of the information station 1 being pressed. Further, for example, visiting may be detected using a predetermined sensor (not illustrated).

The display control unit 103 executes control to display a QR code (registered trademark) for transmitting the information exclusive for visitors or the regional information to the user terminal 4 when visiting of the user U is detected by the visiting detection unit 102. The user U can acquire the information exclusive for visitors or the regional information via the user terminal 4 by waving the user terminal 4 over the information station 1 to read the QR code (registered trademark).

The information acquisition unit 201 acquires the regional information acquired from the commercial facility terminal 5. The regional information acquired by the information acquisition unit 201 is stored in a database which is not illustrated, of the washing machine 2, and managed.

The usage detection unit 202 detects utilization of the washing machine 2 by the user U. Note that a specific method when the usage detection unit 202 detects utilization of the washing machine 2 by the user U is not particularly limited. For example, utilization may be detected by starting operation being performed on the dedicated app or the dedicated site. Further, for example, utilization may be detected by starting operation being performed on an operation screen displayed on the display D1 of the washing machine 2.

When the usage detection unit 202 detects utilization of the washing machine 2 by the user U, the display control unit 203 executes control to display a QR code (registered trademark) for transmitting the information exclusive for users or the regional information to the user terminal 4. The user U can acquire the information exclusive for users or the regional information via the user terminal 4 by waving the user terminal 4 over the information station 1 to read the QR code (registered trademark).

The language switch unit 204 executes control to display a plurality of different languages in a switchable manner.

The settlement support unit 205 supports settlement using a predetermined method (such as the dedicated app, cash and an IC card) when the user U utilizes the washing machine 2. For example, in a case where an amount of cash inserted into a coin slot C of the washing machine 2 is equal to or greater than the fee, the settlement support unit 205 causes the washing machine 2 to start driving and performs refund processing of an amount exceeding the fee as support of settlement by cash.

The information acquisition unit 401 acquires the information exclusive for visitors, the information exclusive for users and the regional information respectively associated with the QR code (registered trademark) displayed at the information station 1. Further, the information acquisition unit 401 acquires the information exclusive for visitors, the information exclusive for users and the regional information respectively associated with the QR code (registered trademark) displayed at the washing machine 2. Specifically, the information acquisition unit 401 acquires a coupon for the store T, an advertisement and a coupon for the nearby commercial facility M, a point, or the like, as the information exclusive for visitors, the information exclusive for users and the regional information.

The display control unit 402 executes control to display a UI of the dedicated app installed at the user terminal 4. Further, the display control unit 402 executes control to display the dedicated site which is accessed using the browser function of the user terminal 4. Further, the display control unit 402 executes control to display the information exclusive for visitors, the information exclusive for users and the regional information acquired by the information acquisition unit 401. Specifically, the information acquisition unit 401 executes control to display a coupon for the store T, an advertisement and a coupon for the nearby commercial facility M, a point, or the like, as the information exclusive for visitors, the information exclusive for users and the regional information. Further, the display control unit 402 executes control to cause questionnaires regarding a different business type which can be answered by the user U through input operation to be displayed so that the user U can fill in the questionnaires.

The transmission control unit 403 executes control to transmit various kinds of information to each of the information station 1, the washing machine 2 and the server 3. Specifically, for example, the transmission control unit 403 executes control to transmit results of answers to the questionnaires regarding a different business type, which are filled in by the user U to the server 3.

A specific example of the UI to be displayed at the user terminal 4 will be described next with reference to FIG. 6A to FIG. 6D. FIG. 6A to FIG. 6D are views illustrating a specific example of the UI to be displayed at the user terminal when the user operates the user terminal to utilize the washing machine.

As illustrated in FIG. 6A, a settlement method of the usage fee of the washing machine 2 is displayed at the user terminal 4 so as to be able to be selected (step SS11). The user U selects a desired settlement method. Note that in FIG. 6A, four companies (companies A to D) which allow settlement using a QR code (registered trademark) are indicated as a settlement method of the usage fee of the washing machine 2 along with the advertisement of the nearby commercial facility M.

When the user U performs operation of selecting one company among these four companies, a screen for reading the QR code (registered trademark) is displayed on the screen of the user terminal 4 (step SS12). The user U reads the QR code (registered trademark) displayed on the display D1 of the washing machine 2 by operating the user terminal 4.

When the user terminal 4 reads the QR code (registered trademark), a number indicating the washing machine 2 to be utilized by the user U among one or more washing machines 2 provided at the store T and buttons for confirming intention of the user U to use the washing machine 2 are displayed (step SS13). Note that in the example in FIG. 6A, "7" is displayed as the number indicating the washing machine 2 to be utilized by the user U. Further, as the buttons for confirming intention of the user U to use the washing machine 2, a "cancel" button B1 and a "yes" button B2 are displayed. The user U performs operation of selecting the "yes" button B2 after confirming the number ("7" in the example in FIG. 6A) indicating the washing machine 2 displayed at the user terminal 4.

If the button B2 is selected, buttons for selecting a course are displayed at the user terminal 4 (step SS14). Note that in the example in FIG. 6A, as buttons for selecting one of the three courses, a "washing and drying" button B3, a "washing" button B4 and a "drying" button B5 are displayed. Note that a "cancel" button B6 is a button to be pressed to return to the previous screen (the screen displayed in step SS13). The user U puts the laundry into the washing machine 2 and performs operation of selecting one of the three courses displayed at the user terminal 4.

It is, for example, assumed in the example in FIG. 6A that the "washing and drying" button B3 is selected.

If the button B3 is pressed, a weight of the laundry is automatically measured by the washing machine 2, and, as illustrated in FIG. 6B, an amount (weight) of the laundry and an expected time required for finishing washing and drying are displayed. Further, along with these, a button for setting a time of washing and drying and fee is displayed. Specifically, a scrolling button B7 with "30 minutes: 300 yen", "40 minutes: 400 yen" and "50 minutes: 500 yen" is displayed (step SS15). The user U selects a desired washing and drying time and fee while scroll displaying the scrolling button B7 in a vertical direction. It is, for example, assumed in the example in FIG. 6B that "90 minutes: 900 yen" is selected.

If the washing and drying time and fee is selected, a message of "please confirm selection" along with notation of "90 minutes: 900 yen" is displayed at the user terminal 4. Further, a "reselect" button B8 and a "pay" button B9 are displayed (step SS16). The user U presses the "pay" button B9 if he/she accepts the washing and drying time and fee.

If the button B9 is pressed, a message of "the above settlement has been completed" is displayed along with notation of "90 minutes: 900 yen, ABC Pay". Further, a "start" button B10 is displayed (step SS17). The user U presses the "start" button B10.

If the button B10 is pressed, a number indicating countdown to start of washing ("3" in the example in FIG. 6B) is displayed along with a message of "washing will be started". Further, a message of "please press this button within one minute in a case where a fabric softener is not required" and a "no fabric softener" button B11 is displayed (step SS18). The user U presses the "no fabric softener" button B11 in a case where he/she does not use a fabric softener. The user U waits for completion of the countdown without any operation in a case where he/she uses a fabric softener.

Figure 6C:
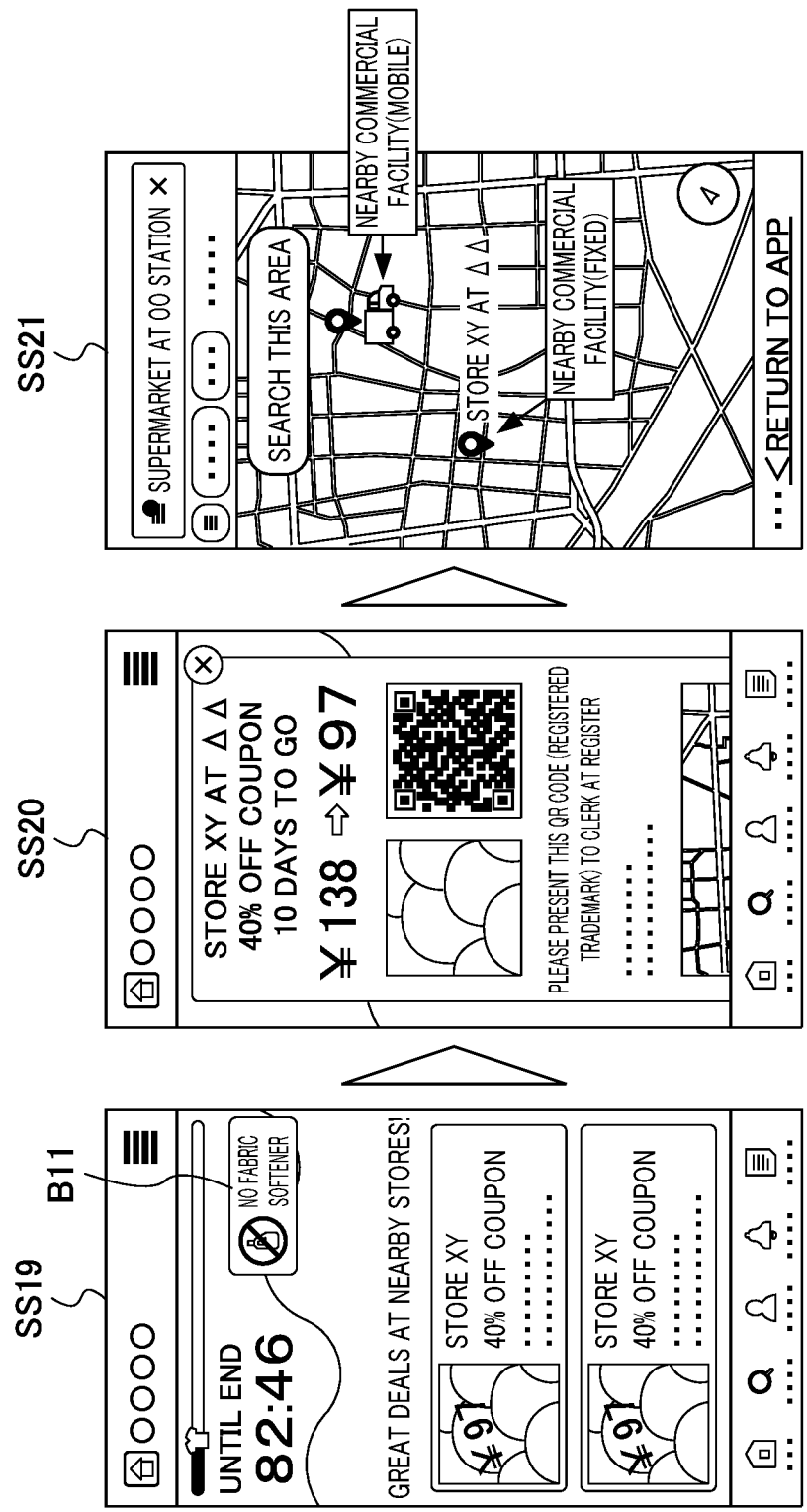
FIG. 6C is a view illustrating a specific example of a UI to be displayed at the user terminal when the user operates the user terminal to utilize the washing machine.

If the countdown to start of washing is completed, washing is started. Then, as illustrated in FIG. 6C, a time required for completing washing and drying is displayed. Specifically, a number indicating countdown to completion of washing and drying ("82:46" in the example in FIG. 6C) is displayed along with a message of "until end". Further, in a case where the "no fabric softener" button B11 is not pressed in step SS8, the button B11 is continuously displayed along with a remaining time during which the button can be pressed. Further, an advertisement and a usage coupon as the regional information are displayed below the number indicating countdown to completion of washing and drying. Specifically, an advertisement and a usage coupon are displayed so as to be able to be selected along with a message of "Great deals at nearby stores!" (step SS19). The user U selects information which he/she is interested in among the regional information displayed at the user terminal 4. The user U can effectively use a time while he/she is waiting for completion of washing and drying because the user U can browse the regional information displayed at the user terminal 4. Further, the nearby commercial facility M can expect advertising effectiveness to the user U.

If one piece of the regional information displayed at the user terminal 4 is selected, a QR code (registered trademark) which becomes a coupon is displayed along with detailed information of the selected information. This enables the user U to receive a discount, or the like, by having the QR code (registered trademark) which becomes a coupon read at the target nearby commercial facility M (step SS20). Note that a screen on which the QR code (registered trademark) which becomes a coupon is displayed can be displayed any time within a validity period by being stored, or the like. Thus, the user U can utilize the coupon when he/she stops by the target nearby commercial facility M after finishing washing and drying and leaving the store T or can utilize the coupon when he/she visits the target nearby commercial facility M at a later date within the validity period.

A map for accessing the target nearby commercial facility M is displayed in the detailed information of the regional information displayed at the user terminal 4 (step SS21). While a location of the nearby commercial facility M to be displayed in the map is indicated on the basis of company information of the nearby commercial facility M, there is, for example, a case where the nearby commercial facility M is a catering vehicle, or the like. In such a case, a current location based on information regarding a location of a global positioning system (GPS), or the like, is displayed on the map.

Further, while the washing machine 2 is washing and drying the laundry, a game dedicated for the present service can be displayed at the user terminal 4 (step SS22). Specifically, for example, as illustrated in FIG. 6D, it is also possible to allow the user to play a washing game, or the like, which is a game of putting laundry flowing from a side of the screen into a basket by tapping and reflect a point obtained in the game in the coupon. Further, for example, a related character may appear. By this means, the user U can effectively use a waiting time of washing and drying and can acquire a coupon. This can result in increase of new users and repeaters of the store T.

When washing and drying by the washing machine 2 are completed, a message of "washing and drying have been finished" and messages such as "thank you for using the washing machine" and "we look forward to serving you again" are displayed. Further, along with the messages, a "display receipt" button B12 is displayed. Further, messages such as "please do not leave laundry for a long time" and "please don't leave your belongings behind" are displayed as awareness-raising and notices to the user U who has utilized the washing machine 2 (step SS23).

If the button B12 is pressed, a receipt is displayed (step SS24). The displayed receipt can be stored. This can achieve paperless.

Figure 7A:
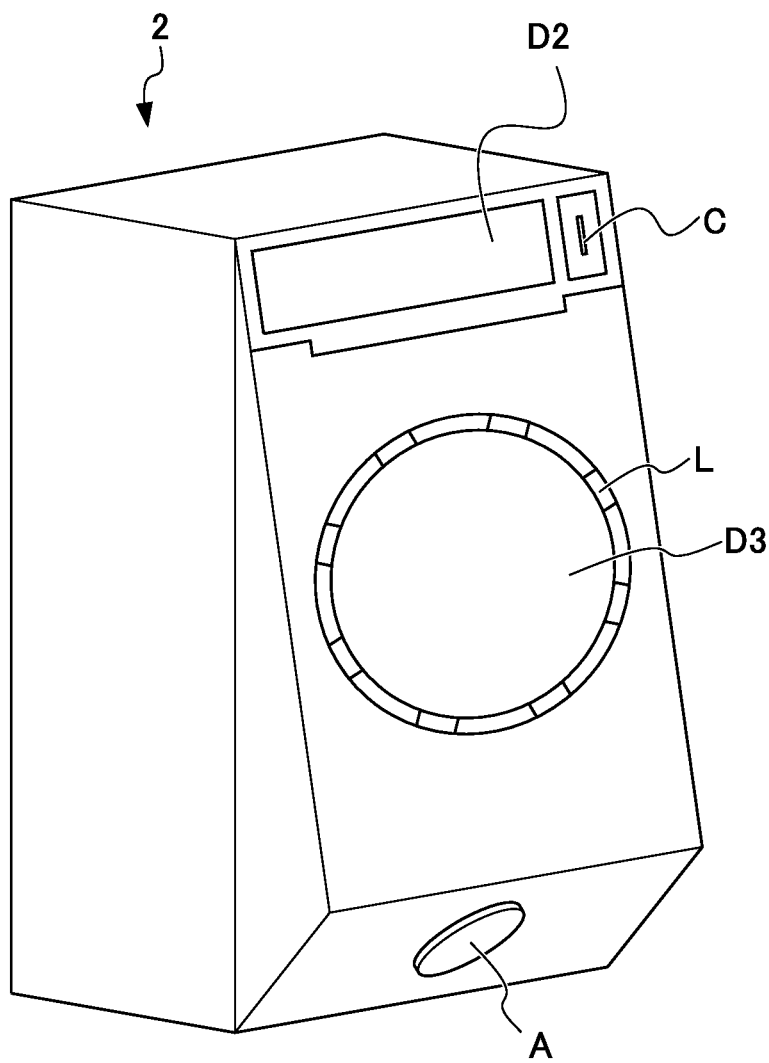
FIG. 7A is a view illustrating an example of an aspect of the washing machine which constitutes the information processing system in FIG. 3.
Figure 7B:
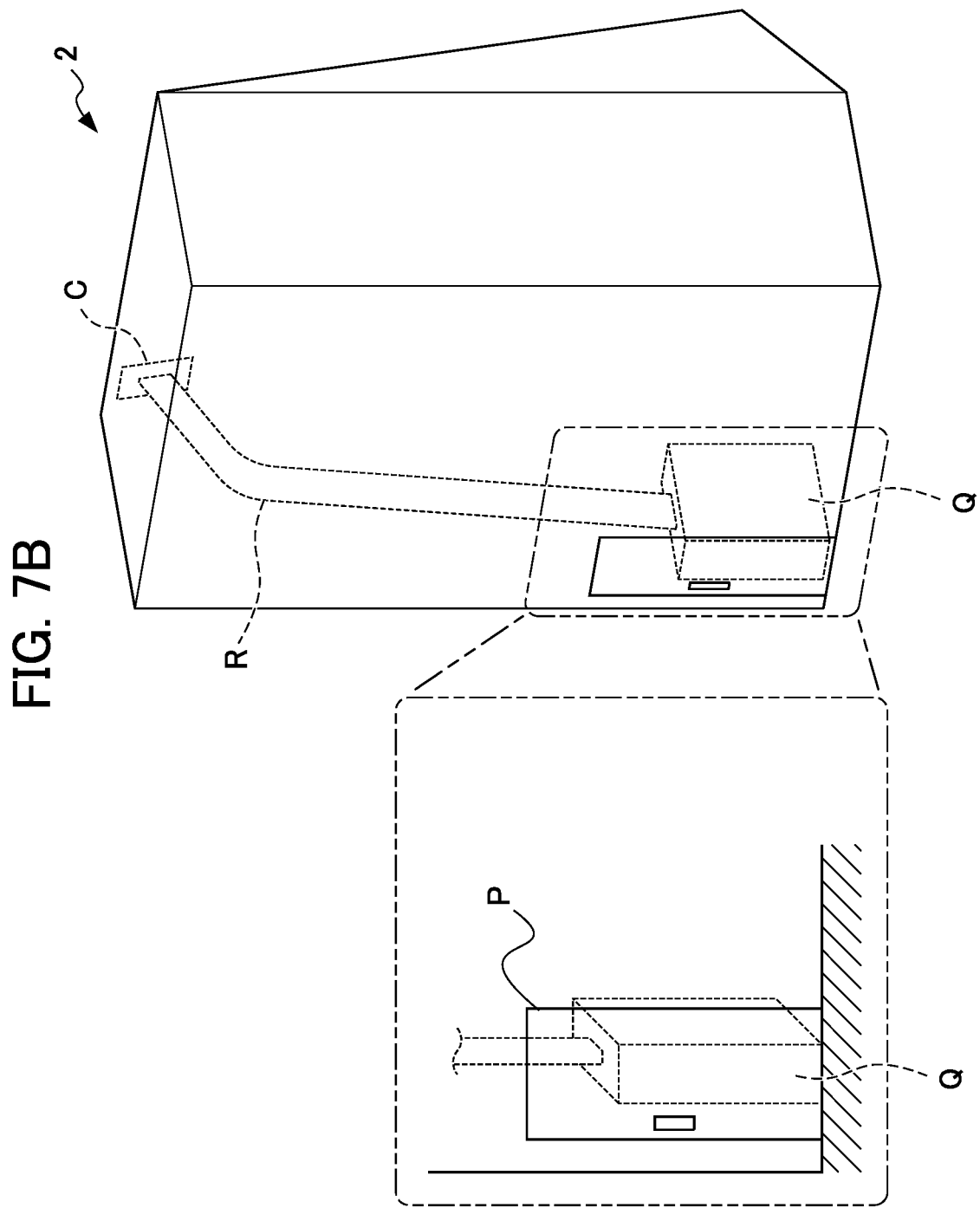
FIG. 7B is a view illustrating an example of an aspect of the washing machine which constitutes the information processing system in FIG. 3.

A method for supporting a person who utilizes the washing machine 2 through settlement in cash and the store T which collects cash will be described next with reference to FIG. 7A and FIG. 7B. FIG. 7A and FIG. 7B are views illustrating an example of an aspect of a washing machine which constitutes the information processing system in FIG. 3.

FIG. 7A is a front perspective view illustrating appearance of the washing machine 2 having a cash settlement function. FIG. 7B is a rear perspective view of appearance of the washing machine 2 having the cash settlement function. As illustrated in FIG. 7A and FIG. 7B, the washing machine 2 having the cash settlement function includes a display D2, a display D3, a lamp L, a coin slot C, a cash storage box Q, a pipe R, a door P, and an air inlet A.

The display D2 is a monitor which displays a UI for accepting operation to the washing machine 2, and the information exclusive for visitors, the information exclusive for users, the regional information, or the like, through digital signage. The display D3 is a monitor which displays the information exclusive for visitors, the information exclusive for users, the regional information, or the like, through digital signage.

The lamp L is a light emitter disposed at an outer edge portion of the display D3. The lamp L emits light in multiple colors in accordance with a usage situation of the washing machine 2. For example, the lamp L may be caused to emit light in blue during washing and may be caused to emit light in yellow during drying. In a case where the laundry which the user U has forgotten to collect is left in the washing machine 2, the lamp L may be caused to blink in red. This enables the user U to know a situation of washing only by viewing color of light emission of the lamp L. Note that a specific configuration of the lamp L is not particularly limited. For example, as a further specific example, a light emitting diode (LED), an organic electro-luminescence (EL), a liquid crystal element, or the like, can be employed.

The coin slot C is a slot into which the user U who utilizes the washing machine 2 through settlement in cash puts cash. Note that while not illustrated, a coin return slot for discharging change in a case where an amount of the put-in cash is greater than the fee is of course provided. The cash storage box Q is a box for storing the cash put into the coin slot C. The pipe R is a pipe which connects the coin slot C and the cash storage box Q. The cash put into the coin slot C passes through the pipe R and is stored in the cash storage box Q.

The door P is a door with a key, which is provided on a rear surface of the washing machine 2. The cash stored in the cash storage box Q can be quickly taken out by opening the door P. This can shorten work for collecting money as the store T. The air inlet A is an air inlet for drying. Note that while not illustrated, an air outlet for discharging the intake air is also provided.

While one embodiment of the present invention has been described above, the present invention is not limited to the above-described embodiment, and changes, modifications, or the like, within a range in which the object of the present invention can be achieved are regarded as being incorporated into the present invention.

For example, while in the above-described embodiment, the information station 1 displays a QR code (registered trademark) when visiting of the user U is detected, the present invention is not limited to this. For example, an advertisement and a QR code (registered trademark) of the nearby commercial facility M may be always displayed at the information station 1, so that the user U who visits the store can always read the QR code using the user terminal 4.

Further, for example, the UI of the washing machine 2 illustrated in FIG. 2 and the UI of the user terminal 4 illustrated in FIG. 6A to FIG. 6D are merely examples. In addition to the UIs respectively illustrated in FIG. 2 and FIG. 6A to FIG. 6D, various aspects of UIs which can implement the present service can be employed.

Further, the system configuration illustrated in FIG. 3 and the hardware configuration of the information station 1 illustrated in FIG. 4 are merely examples for achieving the object of the present invention, and the system configuration and the hardware configuration are not particularly limited.

Further, the functional block diagram illustrated in FIG. 5 is merely an example, and the functional block diagram is not particularly limited. In other words, it is only necessary that the information processing system in FIG. 5 have functions which can execute the above-described series of processing as a whole, and what kind of functional blocks are used to implement the functions is not particularly limited to the example in FIG. 5.

Further, positions where the functional blocks exist are not limited to the example in FIG. 5 and may be arbitrarily set. While in the example in FIG. 5, various kinds of processing are performed by collaboration among various kinds of hardware which constitute the above-described information processing system, the configuration is not limited to this. For example, at least part of the functional blocks provided on the information station 1 side may be provided on the washing machine 2 side or the user terminal 4 side. Further, for example, at least part of the functional blocks provided on the washing machine 2 side or the user terminal 4 side may be provided on the information station 1 side.

Further, the above-described series of processing can be executed by hardware or can be executed by software. Further, one functional block may be constituted with hardware alone, may be constituted with software alone or may be constituted with combination of hardware and software.

In a case where the series of processing is executed by software, a program which constitutes the software is installed at a computer, or the like, from a network or a recording medium. The computer may be a computer incorporated into dedicated hardware. Further, the computer may be a computer, for example, a general-purpose smartphone or a personal computer as well as a server, which can execute various kinds of functions by various kinds of programs being installed.

The recording medium including such programs includes a recording medium, or the like, which is provided to the user in a state where the recording medium is incorporated into an apparatus body in advance as well as a removable medium which is not illustrated, and which is distributed separately from the apparatus body to provide the programs to the user.

Note that in the present specification, a step of describing programs to be recorded in the recording medium includes not only processing to be performed in chronological order along the order, but also includes processing to be parallelly or individually executed, which are not always performed in chronological order. Further, in the present specification, a term of a system means a general apparatus constituted with a plurality of apparatuses, a plurality of units, or the like.

In conclusion, the information processing system to which the present invention is to be applied only requires to have the following configuration and can take various kinds of embodiments. In other words, the information processing system to which the present invention is to be applied is an information processing system including a store terminal (for example, the information station 1 in FIG. 1) provided at a store (for example, the store T in FIG. 1), a management target apparatus (for example, the washing machine 2 in FIG. 1) to be managed by the store terminal at the store, and a user terminal (for example, the user terminal 4 in FIG. 1) to be operated by a user (for example, the user U in FIG. 1) who utilizes the management target apparatus, the store terminal including a first display control unit (for example, the display control unit 103 in FIG. 5) configured to execute control to display second information (for example, the above-described QR code (registered trademark)) for transmitting first information regarding utilization of the store or a nearby commercial facility of the store to the user terminal in a case where a first requirement indicating that the user visits the store is satisfied (for example, detection by the visiting detection unit 102 in FIG. 5), the management target apparatus including a second display control unit (for example, the display control unit 203 in FIG. 5) configured to display a predetermined advertisement (for example, an advertisement of the store T or an advertisement of the nearby commercial facility M) and configured to execute control to display fourth information (for example, the above-described QR code (registered trademark)) for transmitting third information different from the first information to the user terminal as information regarding utilization of the store or the nearby commercial facility of the store in a case where a second requirement indicating that the user utilizes the management target apparatus is satisfied (for example, detection of utilization by the usage detection unit 202 in FIG. 5), and the user terminal including an acquisition unit (for example, the information acquisition unit 401 in FIG. 5) configured to acquire each of the second information displayed at the store terminal and the fourth information displayed at the management target apparatus.

By this means, the store terminal detects visiting of the user and displays the second information for transmitting the first information regarding utilization of the store or the nearby commercial facility to the user terminal. Further, the management target apparatus displays the predetermined advertisement, detects utilization by the user and displays the fourth information for transmitting the third information different from the first information to the user terminal as the information regarding utilization of the store or the nearby commercial facility. Further, the user terminal acquires the second information displayed at the store terminal and the fourth information displayed at the management target apparatus. As a result, it is possible to increase advertising revenue from the nearby commercial facility, improve user-friendliness and a utilization rate of the user who utilizes the store and contribute to regional activation.

Further, at least one of the first information or the third information can be information regarding an incentive (for example, the above-described visiting coupon and usage coupon) which can be obtained when the user utilizes the store or the nearby commercial facility of the store.

This enables the user to acquire the information regarding a predetermined incentive which can be obtained when the user utilizes the store or the nearby commercial facility upon visiting of the store and upon utilization of the management target apparatus, via the user terminal. As a result, it is possible to increase advertising revenue from the nearby commercial facility and further improve user-friendliness and a utilization rate of the store. Further, the user is encouraged to utilize the nearby commercial facility, so that it is possible to contribute to regional activation.

Further, the management target apparatus can further include a language switch display unit (for example, the language switch unit 204 in FIG. 5) configured to display a plurality of different languages in a switchable manner.

This facilitates switching between the languages of messages and the like to be displayed at the management target apparatus, so that foreigners can utilize the store at ease. As a result, it is possible to further improve user-friendliness and a utilization rate of the store. Further, foreigners are encouraged to utilize the nearby commercial facility, so that it is possible to further contribute to regional activation.

Further, the management target apparatus can further include a coin slot (for example, the coin slot C in FIG. 7A), a storage part (for example, the cash storage box Q in FIG. 7A) configured to store cash put into the coin slot, and a cash settlement unit (for example, the settlement support unit 205 in FIG. 5) configured to start operation of the management target apparatus and to perform refund processing of an amount exceeding a predetermined amount in a case where an amount of the cash put into the coin slot is equal to or greater than the predetermined amount.

By this means, the management target apparatus supports utilization of cash, so that even a person who does not possess a user terminal or a person who cannot make settlement using other settlement methods (such as settlement using a credit card and a settlement using an IC card) can utilize the store. As a result, it is possible to further improve user-friendliness and a utilization rate of the store.

Further, the management target apparatus can include one or more displays (for example, the displays D2 and D3) which can display a predetermined advertisement through digital signage.

By this means, the predetermined advertisement is displayed on the display, so that advertising effectiveness to the user who utilizes the management target apparatus can be expected.

Further, the user terminal can further include a display control unit (for example, the display control unit 402 in FIG. 5) configured to execute control to display at least one of questionnaires (for example, the above-described questionnaires regarding a different business type) which can be answered by the user through input operation, the first information or the third information.

This enables the user to answer, for example, questionnaires with a privilege by utilizing a waiting time, or the like, while the user is utilizing the management target apparatus, so that it is possible to further improve user-friendliness and a utilization rate of the coin laundry. Further, by putting information regarding utilization of the nearby commercial facility in content of the questionnaires, it is possible to encourage the user to utilize the nearby commercial facility. As a result, it is possible to further contribute to regional activation.

Further, the user terminal can support cashless settlement (for example, cashless settlement using the user terminal 4 in FIG. 1) of a predetermined fee to be charged by utilization of the management target apparatus, through input operation by the user.

This enables the user to perform remote operation (for example, outside the store) of settlement of a fee of the management target apparatus only by operating the user terminal. As a result, it is possible to achieve utilization of the management target apparatus in the so-called cashless manner by utilizing the user terminal.

EXPLANATION OF REFERENCE NUMERALS

1 information station
2 washing machine
3 server
4 user terminal
11 CPU
12 ROM
13 RAM
14 bus
15 input/output interface
16 input unit
17 output unit
18 storage unit
19 communication unit
20 drive
40 removable medium 101 information acquisition unit
102 visiting detection unit
103 display control unit
201 information acquisition unit
202 usage detection unit
203 display control unit
204 language switch unit
205 settlement support unit
401 information acquisition unit
402 display control unit
403 transmission control unit
181 regional information DB
G service provider
T store
U user
M nearby commercial facility
N network
D display
C coin slot
R pipe
L lamp
A air inlet
Q cash storage box
P door It is claimed:

1. An information processing system comprising:
a store terminal provided at a store that provides services;
a management target apparatus to be managed by the store terminal at the store; and
a user terminal to be operated by a user who utilizes the management target apparatus,
the store terminal comprising:
 a first display control unit configured to execute control to display second information for transmitting first information regarding utilization of the store or utilization of a nearby commercial facility that sponsors the services of the store to the user terminal in a case where a first requirement indicating that the user visits the store is satisfied,
the management target apparatus comprising:
 a usage detection unit for detecting utilization of the management target apparatus by the user;
 a display displaying a user interface for utilizing the management target apparatus;
 a second display control unit configured to display a predetermined advertisement on the display and configured to execute control to display fourth information for transmitting third information different from the first information to the user terminal as information regarding utilization of the store or the nearby commercial facility of the store in a case where a second requirement indicating that the user utilizes the management target apparatus is satisfied by the usage detection unit, and
the user terminal comprising:
 an information acquisition unit configured to acquire each of the second information displayed at the store terminal and the fourth information displayed at the management target apparatus; and
 a third control unit configured to control the display and present information regarding an incentive which can be obtained when the user utilizes the store or the nearby commercial facility of the store, at least while the management target apparatus is being utilized by the user.

2. The information processing system according to claim 1,
wherein with respect to information regarding the incentive which can be obtained when the user utilizes the store or the nearby commercial facility of the store, the third information is more advantageous for the user than the first information.

3. The information processing system according to claim 1, wherein the management target apparatus further comprises: a language switch display unit configured to display a plurality of different languages in a switchable manner.

4. The information processing system according to claim 1, wherein the management target apparatus further comprises:
a coin slot;
a storage part configured to store cash put into the coin slot; and
a cash settlement unit configured to start operation of the management target apparatus and to perform refund processing of an amount exceeding a predetermined amount in a case where an amount of the cash put into the coin slot is equal to or greater than the predetermined amount.

5. The information processing system according to claim 1, wherein the management target apparatus comprises: one or more displays which can display a predetermined advertisement regarding the store or the nearby commercial facility of the store through digital signage.

6. The information processing system according to claim 1, wherein the user terminal is configured to execute control to display, through the third display control unit, at least one of questionnaires which can be answered by the user through input operation, the first information or the third information.

7. The information processing system according to claim 1, wherein the user terminal supports cashless settlement of a predetermined fee to be charged by utilization of the management target apparatus, through input operation by the user.

8. The information processing system according to claim 1, wherein the third display control unit is configured to execute control to selectively display, as the third information, information regarding the incentive which is at least one of advertisements, access information, coupons, and points.

9. The information processing system according to claim 1,
wherein the management target a apparatus includes at last one of a washing machine, a laundry dryer, and a washing and drying machine, and
wherein the management target apparatus can be remotely operated to lock and unlock the lid for putting in and out laundry through the user terminal or the store terminal.

10. The information processing system according to claim 9, wherein a third display control unit controls a display for obtaining information regarding the incentive for user who has collected laundry within a predetermined time after the user finishes utilizing the management target apparatus, the information regarding the incentive is information that is more advantageous than the user who did not collect the laundry within the predetermined time.

11. The information processing system according to claim 1, wherein a third display control unit is configured to
execute control to display agorae dedicated to the service that can be played by the user, and
execute control to display information regarding the incentive related to at least one of coupons and points given according to a game result of the game.

12. The information processing system according to claim 1,
- wherein the management target apparatus has a lock function,
- the management target apparatus and/or the user terminal has a display function that allow's the user to know a condition of the management target apparatus according to the usage situation of the user, and
- the management target apparatus and/or the user terminal capable of lock or unlock the management target apparatus by the lock function through the operation of the store terminal or the user terminal according to the condition of the management target apparatus.

* * * * *